(12) United States Patent
Alexander et al.

(10) Patent No.: US 12,112,164 B2
(45) Date of Patent: Oct. 8, 2024

(54) MACHINE CODE INSTRUCTION

(71) Applicant: Graphcore Limited, Bristol (GB)

(72) Inventors: Alan Alexander, Wotton-Under-Edge (GB); Simon Knowles, Bristol (GB); Godfrey Da Costa, Bristol (GB); Badreddine Noune, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 45 days.

(21) Appl. No.: 18/176,034

(22) Filed: Feb. 28, 2023

(65) Prior Publication Data

US 2023/0281013 A1    Sep. 7, 2023

(30) Foreign Application Priority Data

Mar. 1, 2022 (GB) ..................... 2202794

(51) Int. Cl.
*G06F 9/30* (2018.01)
(52) U.S. Cl.
CPC ........ *G06F 9/30014* (2013.01); *G06F 9/3013* (2013.01)
(58) Field of Classification Search
None
See application file for complete search history.

(56) References Cited

U.S. PATENT DOCUMENTS

| 7,071,947 | B1 | 7/2006 | Papakipos | |
| 7,506,135 | B1 * | 3/2009 | Mimar | G06F 9/3004 712/7 |
| 9,513,905 | B2 * | 12/2016 | Smelyanskiy | G06F 9/30021 |
| 2013/0007076 | A1 | 1/2013 | Wegener | |
| 2016/0078654 | A1 * | 3/2016 | Schlossnagle | G06F 16/2477 345/440.2 |

(Continued)

FOREIGN PATENT DOCUMENTS

EP        3314407 A1 *  5/2018  ......... G06F 15/8007

OTHER PUBLICATIONS

Micikevicius, Paulius et al., "Mixed Precision Training", Published at ICLR, Feb. 15, 2018. URL: https://arxiv.org/pdf/1710.03740.pdf. Section 3; figures 2, 3.

(Continued)

*Primary Examiner* — Eric Coleman
(74) *Attorney, Agent, or Firm* — HAYNES AND BOONE, LLP

(57) ABSTRACT

A processing device comprising a plurality of operand registers, wherein a first subset of the operand registers are configured to store state information for a plurality of bins, comprising a range of values and a bin count associated with each respective bin, wherein a second subset of the operand registers is configured to store a vector of floating-point values; and an execution unit configured to execute a first instruction taking the state information for the plurality of bins and the vector of floating-point values as operands, and in response to execution of the first instruction, for each of the floating-point values: identify based on an exponent of the respective floating-point value, each one of the plurality of bins for which the respective floating-point value falls within the associated range of values; and increment the bin count associated with the identified bins.

28 Claims, 7 Drawing Sheets

(56) References Cited

U.S. PATENT DOCUMENTS

2016/0378716 A1* 12/2016 Grochowski ....... G06F 9/30101
                                                    712/2
2018/0285364 A1* 10/2018 Mamidipaka ..... G06F 16/24578
2021/0396840 A1* 12/2021 Bekooij ................ G01S 13/723

OTHER PUBLICATIONS

Search Report dated Oct. 18, 2022 for United Kingdom Patent Application No. GB2202794.0. 3 pages.

* cited by examiner

MACHINE CODE INSTRUCTION

CROSS-REFERENCE TO RELATED APPLICATIONS

The present application claims priority to United Kingdom Patent Application No. GB2202794.0 filed Mar. 1, 2022, the disclosure of which is hereby incorporated herein by reference in its entirety.

TECHNICAL FIELD

The present disclosure relates to a machine code instruction for processing vectors.

BACKGROUND

There has been increasing interest in developing processors designed for specific applications, such as graphics processing units (GPUs) and digital signal processors (DSPs). Another type of application-specific processor which has gained interest recently is one dedicated to machine intelligence applications, dubbed by the applicant as an "IPU" (intelligence processing unit). These may be employed for example as accelerator processors arranged to perform work allocated by a host, such as to train or assist in training a knowledge model such as a neural network, or to perform or assist in performing predictions or inferences based on such a model.

A processor designed for machine intelligence applications may include dedicated instructions in its instruction set for performing arithmetic operations commonly employed in machine intelligence applications (the instruction set being the fundamental set of machine code instruction types which the execution unit of the processor is configured to recognize, each type defined by a respective opcode and zero or more operands).

Machine intelligence models are often trained on large amounts of data, which can be costly in terms of compute resources. Recent methods have been developed for improving the efficiency of such training, which use lower-precision representations for data and/or model parameters in order to reduce the memory usage required to process large volumes of data. A recent training methodology for neural network uses mixed precision training, wherein some values of the network have a high-precision representation, such as 32-bit floating point, while other values are represented in a lower-precision format, such as 16-bit floating point. Lower precision formats have a narrower range of representation, and are therefore more susceptible to numerical underflow and overflow. One method used to overcome this issue is known as 'loss scaling', where a loss function used in training a neural network model is scaled in order to prevent gradients of the loss function falling below a threshold of representable values in the chosen low-precision format.

SUMMARY

Histograms are used to approximate distributions of values of different kinds. Floating point numbers processed by a computer may be added to a histogram in order to generate approximate statistics of a set of values being processed in a computer program. This may be useful, for example, to collect data relating to the distribution of values for the given floating-point representation, such as to identify a degree of underflow and/or overflow that occurs when processing a given dataset, which can be reduced by adjusting the representation (e.g. by adjusting the bias) of the values, as described in more detail herein.

Herein described is a machine language instruction defined within an instruction set architecture for a processor, with the instruction configured to assign floating-point values of a vector to bins of a histogram, wherein the instruction is defined for multiple numerical representations, including 8-bit, 16-bit and 32-bit floating point formats. This allows histograms to be collected for sets of values having floating-point representations, which may be used to gain insight into the distribution of data and to enable underflow and overflow to be reduced. A particular advantage of the instruction described herein is that it enables the collection of such statistics with low overhead and high code density, since it enables the generation and updating of histograms in fewer instructions than is enabled by standard arithmetic instructions.

A first aspect disclosed herein provides a processing device comprising: a plurality of operand registers, wherein a first subset of the operand registers is configured to store state information for a plurality of bins, wherein for each of the plurality of bins, the state information comprises a range of values and a bin count associated with the respective bin, wherein a second subset of the operand registers is configured to store a vector of floating-point values; and an execution unit configured to execute a first instruction taking the state information for the plurality of bins and the vector of floating-point values as operands, and in response to execution of the first instruction, for each of the floating-point values: identify based on an exponent of the respective floating-point value, each one of the plurality of bins for which the respective floating-point value falls within the associated range of values for that bin; and increment the bin count associated with the bins identified for the respective floating-point value from among the plurality of bins.

Identifying whether each respective floating-point value falls within the associated range of values for each bin may comprise selecting each bin of the plurality of bins, and for each bin, implementing comparison circuitry to compare the exponent of the respective floating-point value with a condition defining the associated range of values of that bin.

The execution unit may be configured, in response to execution of the first instruction, to identify whether each of a plurality of floating-point values fall within the associated range of values for each of a plurality of bins in parallel.

For each of the bins, the state information may comprise a threshold exponent field, wherein the execution unit is configured to, for each of the floating-point values, perform the identification of the one of the bins in dependence upon the value of the threshold exponent field for the identified one of the bins.

A threshold bin count saturation value may be defined, wherein the execution unit is configured, in response to the execution of the first instruction, for each bin, to compare the bin count to the threshold bin count saturation value, and identify each bin from among an unsaturated subset of bins for which each of the respective floating point values fall within the associated range, the unsaturated subset of bins comprising bins whose bin count is less than the threshold bin count saturation value.

The state information for each bin may comprise a sign indicator for the respective bin, wherein the execution unit further comprises sign check circuitry to compare the sign of each respective floating-point value with the sign indicator of each respective bin, and wherein the associated range of values of each bin comprises only values matching the sign of that bin.

The state information for each bin may comprise at least one mode indicator, wherein the execution unit comprises bin check circuitry, wherein the bin check circuitry is configured to identify the associated range of values for each bin based on the value of the mode indicator for that bin.

In response to the execution of the first instruction, where the respective floating-point value is a subnormal floating-point value, the execution unit may be further configured to identify one of the plurality of bins for which zero falls within the associated range of values for that bin, and increment the bin count associated with the identified one of the plurality of bins. Alternatively, in response to the execution of the first instruction, where the respective floating-point value is a subnormal floating-point value, the execution unit may be further configured to identify one of the plurality of bins for which denormalized values fall within the associated range of values for that bin, and increment the bin count associated with the identified one of the plurality of bins.

The at least one mode indicator may comprise at least one of: the threshold exponent field and a threshold range field.

When the at least one mode indicator indicates a default mode, a lower limit of the associated range of values may be the value of the threshold exponent field, and the upper limit of the range of values may be the sum of the respective values of the threshold exponent field and the threshold range field.

When the mode indicator indicates a first special mode, the associated range for that bin may comprise one of: (i) zero and (ii) the range of denormalized values.

The mode indicator may comprise the threshold exponent field, wherein the first special mode is indicated by a predefined special value of the threshold exponent field.

When the mode indicator indicates a second special mode, the associated range for that bin may comprise all values less than or equal to a threshold for that bin, wherein when the mode indicator indicates a third special mode, the associated range for that bin comprises all values greater than or equal to the threshold for that bin.

The mode indicator may comprise the threshold range field, wherein the second and third special modes are indicated by respective special values of the threshold range field.

The mode indicator may further comprise the threshold range field, wherein when the threshold range value takes a special value of zero the associated range for that bin comprises zero only, and when the threshold range field is non-zero, the associated range for that bin comprises the range of denormalized values.

The execution unit may be configured to process gradients of a machine intelligence application, the gradients scaled by a scaling factor, wherein the first instruction is executed by the execution unit for each of a plurality of vectors of gradients, and wherein the loss scaling factor is adjusted based on a relative count of a predetermined set of the plurality of bins, relative to the total count of all bins.

The first and second subsets of the operand registers may be registers of an arithmetic register file.

The floating-point values may be provided in one of: (i) a thirty-two bit representation; (ii) a sixteen bit representation; or (iii) an eight-bit representation.

The first and second subset of registers may each comprise four 32-bit registers.

A second aspect herein disclosed provides a computer program comprising code configured to run on the processing device of any preceding claim, wherein the code comprises one or more instances of an instruction, taking state information comprising at least a bin count for each of a plurality of bins and a vector of floating-point values as operands, and, when executed, causes the processor to, for each of the floating-point values:
  identify based on an exponent of the respective floating-point value, each bin of the plurality of bins for which the respective floating-point value falls within the associated range of values for that bin; and
  increment the bin count associated with the bins identified for the respective floating-point value from the plurality of bins.

A further aspect herein disclosed provides method of operating any processing device disclosed herein, the method comprising executing a first instruction taking state information comprising a bin count for each of a plurality of bins and a vector of floating-point values as operands, and in response to execution of the first instruction, for each of the floating-point values:
  identifying based on an exponent of the respective floating-point value, each bin of the plurality of bins for which the respective floating-point value falls within the associated range of values for that bin; and
  incrementing the bin count associated with the bins identified for the respective floating-point value from the plurality of bins.

The step of identifying the bins for each respective floating-point value may comprise selecting each bin of the plurality of bins, and for each bin, selecting each of the floating-point values of the vector, and comparing the exponent of each respective floating-point value with a condition defining the associated range of values of that bin.

The method may comprise processing a plurality of combinations of bins and floating-point values in parallel.

The state information may further comprise a threshold exponent field and the method may further comprise, for each of the floating-point values, identifying one of the plurality of bins in dependence upon the value of the threshold exponent field for the respective one of the plurality of bins.

A threshold bin count saturation value may be defined, wherein the method further comprises, for each bin, comparing the bin count to the threshold bin count saturation value, and identifying each bin from among an unsaturated subset of bins for which each of the respective floating point values fall within the associated range, the unsaturated subset of bins comprising bins whose bin count is less than the threshold bin count saturation value.

The state information for each bin may comprise a sign indicator for the respective bin, wherein the method further comprises comparing the sign of each respective floating-point value with the sign indicator of each respective bin, wherein the associated range of values of each bin comprises only values matching the sign of that bin.

The state information for each bin may comprise at least one mode indicator, wherein the method further comprises performing a bin check to identify the associated range of values for each bin based on the value of the mode indicator for that bin. The mode indicator may comprise one or both of a threshold exponent field and a threshold range field.

The method may comprise, where the respective floating-point value is a subnormal floating-point value, identifying one of the plurality of bins for which zero falls within the associated range of values for that bin, and increment the bin count associated with the identified one of the plurality of bins. Alternatively, where the respective floating-point value is a subnormal floating-point value, the method may comprise identifying one of the plurality of bins for which denormalized values fall within the associated range of values for that bin, and increment the bin count associated with the identified one of the plurality of bins.

When the at least one mode indicator indicates a default mode, a lower limit of the associated range of values may be the value of the threshold exponent field, wherein the upper limit of the range of values is the sum of the respective values of the threshold exponent field and the threshold range field. When the at least one mode indicator indicates a first special mode, the associated range for that bin may comprise one of: zero, and the range of denormalized values. The first special mode may be indicated by a predefined special value of the threshold exponent field. In the first special mode, when the threshold range value takes a special value of zero the associated range for that bin may comprise zero only, and when the threshold range field is non-zero, the associated range for that bin may comprise the range of denormalized values.

When the mode indicator indicates a second special mode, the associated range for that bin may comprise all values less than or equal to a threshold for that bin, and when the mode indicator indicates a third special mode, the associated range for that bin may comprise all values greater than or equal to the threshold for that bin.

The vector of values may comprise gradients of a machine intelligence algorithm, wherein the method may further comprise scaling gradients of a machine intelligence algorithm by a scaling factor, wherein the scaling factor is adjusted based on a relative count of a predetermined subset of the plurality of bins, relative to the total count of all bins.

A further aspect herein disclosed provides a non-transitory computer readable storage medium comprising code configured to run on the processing device disclosed herein, wherein the code comprises one or more instances of an instruction, taking state information comprising at least a bin count for each of a plurality of bins and a vector of floating-point values as operands, and, when executed, causes the processor to, for each bin of the floating-point values:
  identify based on an exponent of the respective floating-point value, each of the plurality of bins for which the respective floating-point value falls within the associated range of values for that bin; and
  increment the bin count associated with the bins identified for the respective floating-point value from the plurality of bins.

DETAILED DESCRIPTION

Figure 1:
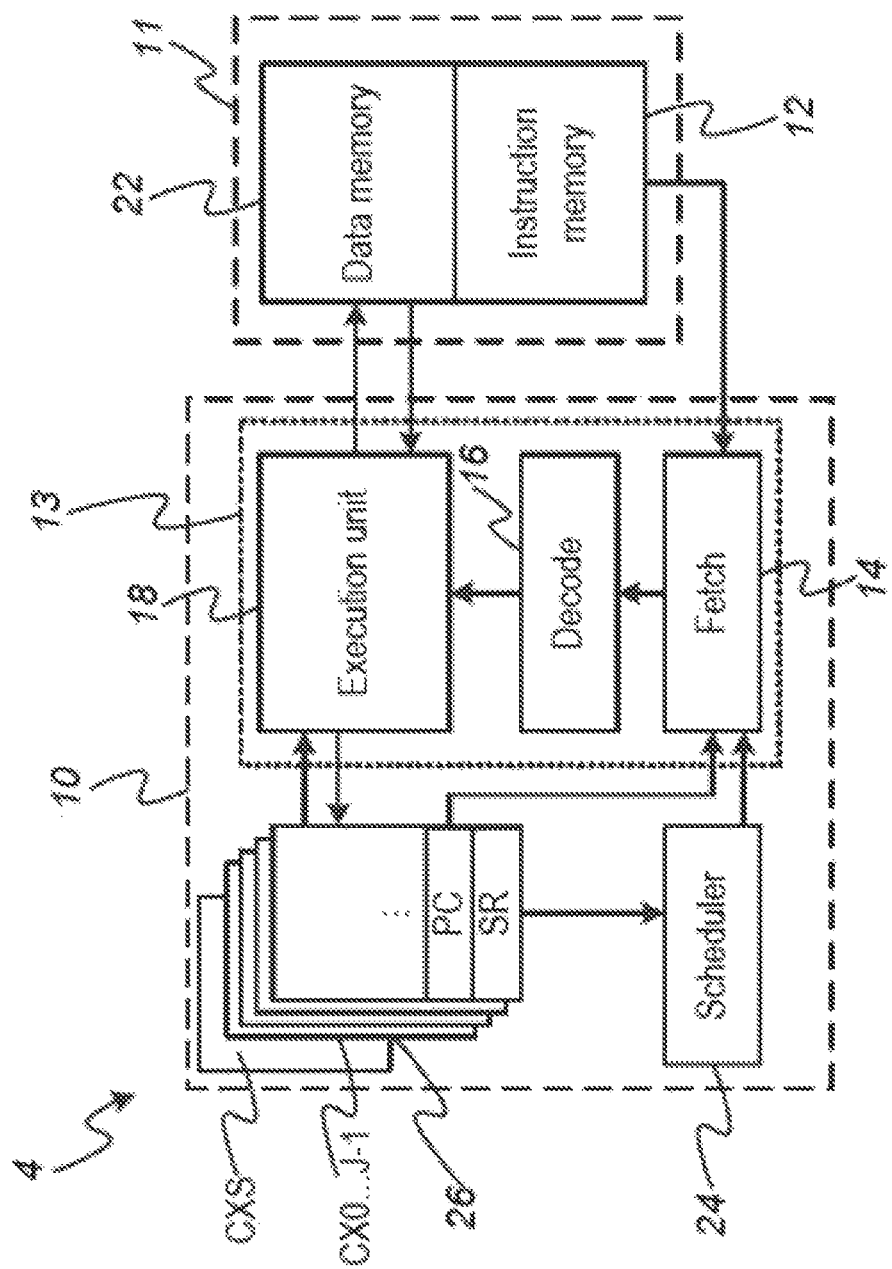
FIG. 1 is a schematic block diagram of an example multi-threaded processor.
Figure 2:
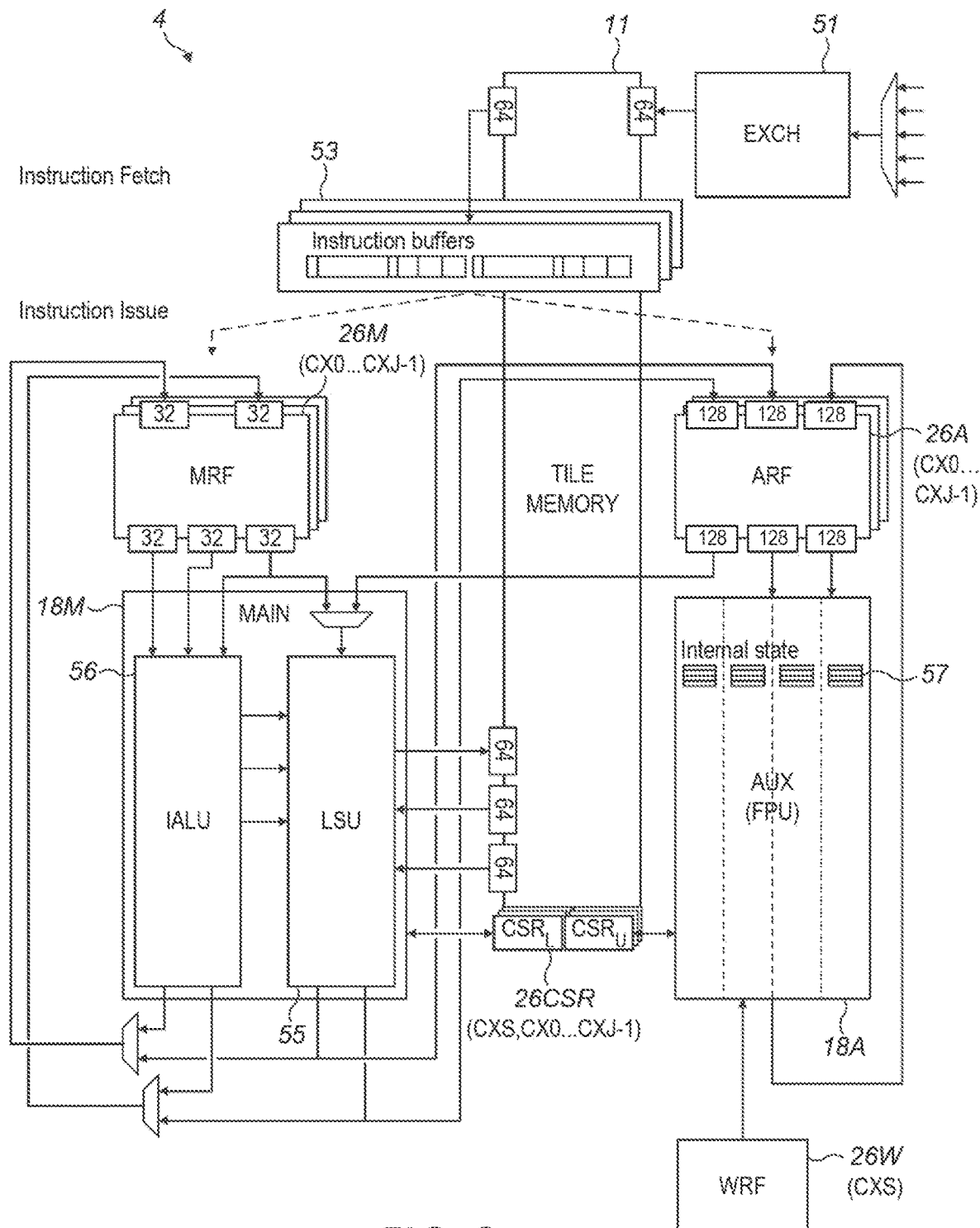
FIG. 2 schematically illustrates a logical block structure of an example processor.

FIG. 1 illustrates an example of a processor 4 in accordance with embodiments of the present disclosure. The architecture of FIGS. 1 and 2 is an exemplary architecture within which the present invention may be implemented. As will be clear to a person skilled in the art of computer architecture, the present invention may be implemented in various processors having different architectures. This architecture is described in further detail in U.S. application Ser. No. 16/276,834, which is herein incorporated by reference in its entirety.

The processor 4 comprises a multi-threaded processing unit 10 in the form of a barrel-threaded processing unit, and a local memory 11 (i.e. on the same tile in the case of a multi-tile array, or same chip in the case of a single-processor chip). A barrel-threaded processing unit is a type of multi-threaded processing unit in which the execution time of the pipeline is divided into a repeating sequence of interleaved time slots, each of which can be occupied by a given thread. This may also be referred to as concurrent execution. The memory 11 comprises an instruction memory 12 and a data memory 22 (which may be implemented in different addressable memory units or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a plurality of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands. In embodiments the program comprises a plurality of worker threads, and a supervisor subprogram which may be structured as one or more supervisor threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture.

The dedicated hardware comprises a separate set of context registers 26 for at least each of the threads that can be executed concurrently, i.e. one set per slot in the cycle. A "context", when talking about multi-threaded processors, refers to the program state of a respective one of the threads being executed alongside one another (e.g. program counter value, status and current operand values). The context registers refer to the respective registers for representing this program state of the respective thread. Each set of context registers 26 comprises a respective one or more control registers comprising at least a program counter (PC) for the respective thread (for keeping track of the instruction address at which the thread is currently executing), and in embodiments also a set of one or more control state registers (CSRs) recording a current status of the respective thread (such as whether it is currently running or paused). Each set of context register files 26 also comprises a respective set of operand registers, for temporarily holding operands of the instructions executed by the respective thread, i.e. values operated upon or resulting from operations defined by the opcodes of the respective thread's instructions when executed. Each set of registers 26 may be implemented in one or more register files. Note that while 'operand' strictly refers to the part of an instruction specifying the data on which to operate, 'operand' is used more generally herein to refer both to register indexes specified in the instruction, and the data held in said registers.

The fetch stage 14 has access to the program counter (PC) of each of the contexts. For each respective thread, the fetch stage 14 fetches the next instruction of that thread from the next address in the program memory 12 as indicated by the program counter. The program counter automatically increments each execution cycle unless branched by a branch instruction. The fetch stage 14 then passes the fetched instruction to the decode stage 16 to be decoded, and the decode stage 16 then passes an indication of the decoded instruction to the execution unit 18 along with the decoded addresses of any operand registers specified in the instruction, in order for the instruction to be executed. The execution unit 18 has access to the operand registers and the control state registers, which it may use in executing the instruction based on the decoded register addresses, such as in the case of an arithmetic instruction (e.g. by adding, multiplying, subtracting or dividing the values in two operand registers and outputting the result to another operand register of the respective thread). Or if the instruction defines a memory access (load or store), the load/store logic of the execution unit 18 loads a value from the data memory into an operand register of the respective thread, or stores a value from an operand register of the respective thread into the data memory 22, in accordance with the instruction.

The fetch stage 14 is connected so as to fetch instructions to be executed from the instruction memory 12, under control of the scheduler 24. The scheduler 24 is configured to control the fetch stage 14 to fetch an instruction from each of a set of concurrently executing threads in turn in a repeating sequence of time slots, thus dividing the resources of the pipeline 13 into a plurality of temporally interleaved time slots.

FIG. 2 illustrates details of a multi-threaded processor 4 including detail of an execution unit 18 and context registers 26.

The processor comprises a respective instruction buffer 53 for each of M threads capable of being executed concurrently. The context registers 26 comprise a respective main register file (MRF) 26M for each of the worker M contexts and the supervisor context. The context registers further comprise a respective auxiliary register file (ARF) 26A for at least each of the worker contexts. The context registers 26 further comprise a common weights register file (WRF) 26W, which all the currently executing worker thread can access to read from. The WRF may be associated with the supervisor context in that the supervisor thread is the only thread that can write to the WRF. The context registers 26 may also comprise a respective group of control state registers 26CSR for each of the supervisor and worker contexts. The execution unit 18 comprises a main execution unit 18M and an auxiliary execution unit 18A. The main execution unit 18M comprises a load-store unit (LSU) 55 and an integer arithmetic logic unit (IALU) 56. The auxiliary execution unit 18A comprises at least a floating point arithmetic unit (FPU).

In each of the J interleaved time slots S0 . . . SJ-1, the scheduler 24 controls a fetch stage 14 to fetch at least one instruction of a respective thread from the instruction memory 11, into the respective one of the J instruction buffers 53 corresponding to the current time slot. In embodiments each time slot is one execution cycle of the processor, though other schemes are not excluded (e.g. weighted round-robin). In each execution cycle of the processor 4 (i.e. each cycle of the processor clock which clocks the program counter) the fetch stage 14 fetches either a single instruction or a small "instruction bundle" (e.g. a two-instruction bundle or four-instruction bundle), depending on implementation. Each instruction is then issued, via the decode stage 16, into one of the LSU 55 or IALU 56 of the main execution unit 18M or the FPU of the auxiliary execution unit 18A, depending on whether the instruction (according to its opcode) is a memory access instruction, an integer arithmetic instruction or a floating-point arithmetic instruction, respectively. The LSU 55 and IALU 56 of the main execution unit 18M execute their instructions using registers from the MRF 26M, the particular registers within the MRF 26M being specified by operands of the instructions.

The FPU of the auxiliary execution unit 18A performs operations using registers in the ARF 26A and WRF 26W, where the particular registers within the ARF are specified by operands of the instructions. In embodiments the registers in the WRF may be implicit in the instruction type (i.e. pre-determined for that instruction type). The auxiliary execution unit 18A may also contain circuitry in the form of logical latches internal to the auxiliary execution unit 18A for holding some internal state 57 for use in performing the operations of one or more of the types of floating-point arithmetic instruction.

Figure 3:
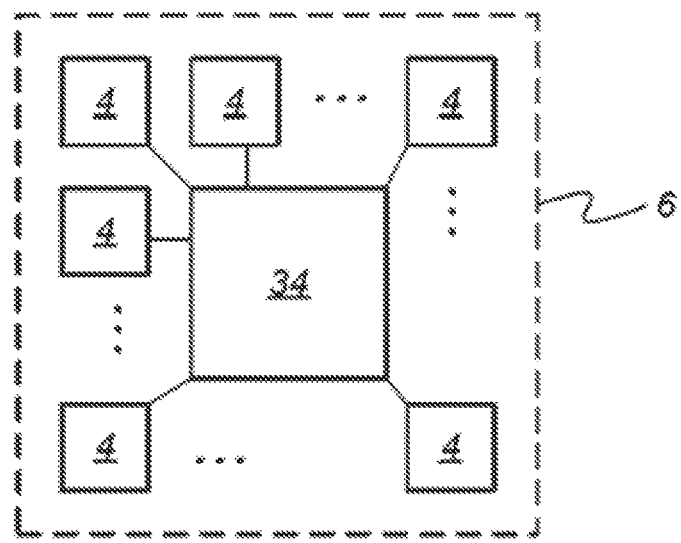
FIG. 3 is a schematic block diagram of a processor comprising an array of constituent processors.

In embodiments that fetch and execute instructions in bundles, the individual instructions in a given instruction bundle are executed simultaneously, in parallel down independent pipelines 18M, 18A (shown in FIG. 3). In embodiments that execute bundles of two instructions, the two instructions may be executed simultaneously down respective auxiliary and main pipelines. In this case, the main pipeline is arranged to execute types of instruction that use the MRF and the auxiliary pipeline is used to execute types of instruction that use the ARF. The pairing of instructions into suitable complementary bundles may be handled by the compiler.

Each worker thread context has its own instance of the main register file (MRF) 26M and auxiliary register file (ARF) 26A (i.e. one MRF and one ARF for each of the barrel-threaded slots). Functionality described herein in relation to the MRF or ARF is to be understood to operate on a per context basis. However there is a single, shared weights register file (WRF) shared between the threads. Each thread can access the MRF and ARF of only its own context 26. However, all currently-running worker threads can access the common WRF. The WRF thus provides a common set of weights for use by all worker threads. In embodiments only the supervisor can write to the WRF, and the workers can only read from the WRF.

The instruction set of the processor 4 includes at least one type of load instruction whose opcode, when executed, causes the LSU 55 to load data from the data memory 22 into the respective ARF, 26A of the thread in which the load instructions was executed. The location of the destination within the ARF is specified by an operand of the load instruction. Another operand of the load instruction specifies an address register in the respective MRF, 26M, which holds a pointer to an address in the data memory 22 from which to load the data. The instruction set of the processor 4 also includes at least one type of store instruction whose opcode, when executed, cases the LSU 55 to store data to the data memory 22 from the respective ARF of the thread in which the store instruction was executed. The location of the source of the store within the ARF is specified by an operand of the store instruction. Another operand of the store instruction specifies an address register in the MRF, which holds a pointer to an address in the data memory 22 to which to store the data. In general the instruction set may include separate load and store instruction types, and/or at least one load-store instruction type which combines the load and store operations in a single instruction.

The instruction set of the processor also includes one or more types of arithmetic instruction for performing arithmetic operations. According to embodiments disclosed herein, these may include at least one type of arithmetic instruction which makes use of the common weights register file, WRF, 26W. This type of instruction takes at least one operand which specifies at least one source of the corresponding arithmetic operation in the respective ARF, 26A, of the thread in which the arithmetic instruction was executed. However, at least one other source of the arithmetic instruction is in the common WRF, common to all the worker threads. In embodiments this source is implicit in the arithmetic instruction in question (i.e. implicit for this type of arithmetic instruction). Implicit in the sense of a machine code instruction means not requiring an operand to specify. I.e. in this case, the location of the source in the WRF is inherent from the opcode (predetermined for that particular opcode). Alternatively in other embodiments, the arithmetic instruction may take an operand specifying from which set of weight registers to take the weights, from amongst a few different sets in the WRF. However, the fact that the source of the weights is found in the WRF (as opposed to, say, the general purpose MRF or ARF) is still implicit.

In response to the opcode of the relevant type of arithmetic instruction, the arithmetic unit (e.g. FPU) in the auxiliary execution unit 18A performs an arithmetic operation, as specified by the opcode, which comprises operating upon the values in the specified source register(s) in the threads' respective ARF and the source register(s) in the WRF. It also outputs a result of the arithmetic operation to a destination register in the thread's respective ARF as specified explicitly by a destination operand of the arithmetic instruction.

Example types of arithmetic instruction that may employ a source in the common WRF 26W include: one or more vector multiplication instruction types, one or more matrix multiplication instruction types, one or more accumulating vector multiplication instruction types and/or accumulating matrix multiplication instruction types (which accumulate a result of the multiplication from one instance of the instruction to the next), and/or one or more convolution instruction types. For example, a vector multiplication instruction type may multiply an explicit input vector from the ARF, 26A, with a predetermined vector of weights from the WRF; or a matrix multiplication instruction type may multiply an explicit input vector from the ARF with a predetermined matrix of weights from the WRF. As another example, a convolution instruction type may convolve an input matrix from the ARF with a predetermined matrix from the WRF. Having a shared weights register file, WRF, common to a plurality of threads, enables each thread to multiply or convolve a common kernel with its own respective data. This is useful as this is a scenario that comes up a lot in machine learning applications, e.g. where each thread represents a different node in a neural network and the common kernel represents a feature being searched or trained for (for instance an edge or particular shape in an area or volume of graphical data).

In embodiments the values in the WRF, 26W, can be written by the supervisor thread. The supervisor (which in embodiment begins by running in all the slots S0 . . . SM) first executes a series of put instructions to write the values of some commune weights into the predetermined location in the WRF. It then executes run instructions (or a run-all instruction) to launch a respective worker in some or all of the slots S0 . . . SJ-1. Each worker then includes one or more instances of one or more arithmetic instructions of the type(s) discussed above, so as to perform the corresponding arithmetic operation(s) upon their own respective input data, as loaded into their respective ARF, 26A, but using the common weights written by the supervisor into the WRF, 26W. When each thread finishes its respective task it executes an exit instruction to hand its slot back to the supervisor. When all the launched threads have finished their respective tasks, the supervisor can write new values to the WRF and launch a new set of threads (or launch a new set to continue to use the existing values in the WRF).

It will be appreciated that the labels "main", "auxiliary" and "weights" are not necessarily limiting. In embodiments they may be any first register file (per worker context), second register file (per worker context) and shared third register file (e.g. part of the supervisor context but accessible to all workers). The ARF 26A and auxiliary execution unit 18 may also be referred to as the arithmetic register file and arithmetic execution unit since they are used for arithmetic instructions (or at least the floating point arithmetic). The MRF 26M and auxiliary execution unit 18 may also be referred to as the memory address register file and arithmetic execution unit since one of their uses is for accessing memory. The weights register file (WRF) 26W is so-called because it is used to hold multiplicative weights used in a certain type or types of arithmetic instruction, to be discussed in more detail shortly. E.g. these could be used to represent the weights of nodes in a neural network. Seen another way, the MRF could be called the integer register file as it is used to hold integer operands, whilst the ARF could be called the floating-point register file as it is used to hold floating-point operands. In embodiments that execute instructions in bundles of two, the MRF is the register file used by the main pipeline and the ARF is the register used by the auxiliary pipeline.

In alternative embodiments however, note that the register space 26 is not necessarily divided into these separate register files for these different purposes. Instead instructions executed through the main and auxiliary execution units may be able to specify registers from amongst the same shared register file (one register file per context in the case of a multithreaded processor). Also the pipeline 13 does not necessarily have to comprise parallel constituent pipelines (e.g. aux and main pipelines) for simultaneously executing bundles of instructions.

The processor 4 may also comprise an exchange interface 51 for exchanging data between the memory 11 and one or more other resources, e.g. other instances of the processor and/or external devices such as a network interface or network attached storage (NAS) device. As illustrated in FIG. 3, in embodiments the processor 4 may form one of an array 6 of interconnected processor tiles, each tile running part of a wider program. The individual processors 4 (tiles) thus form part of a wider processor or processing system 6. The tiles 4 may be connected together via an interconnect subsystem 34, to which they connect via their respective exchange interface 51. The tiles 4 may be implemented on the same chip (i.e. die) or on different chips, or a combination (i.e. the array may be formed from multiple chips each comprising multiple tiles 4). The interconnect system 34 and exchange interface 51 may therefore comprise an internal (on-chip) interconnect mechanism and/or external (interchip) exchange mechanism, accordingly.

Figure 4:
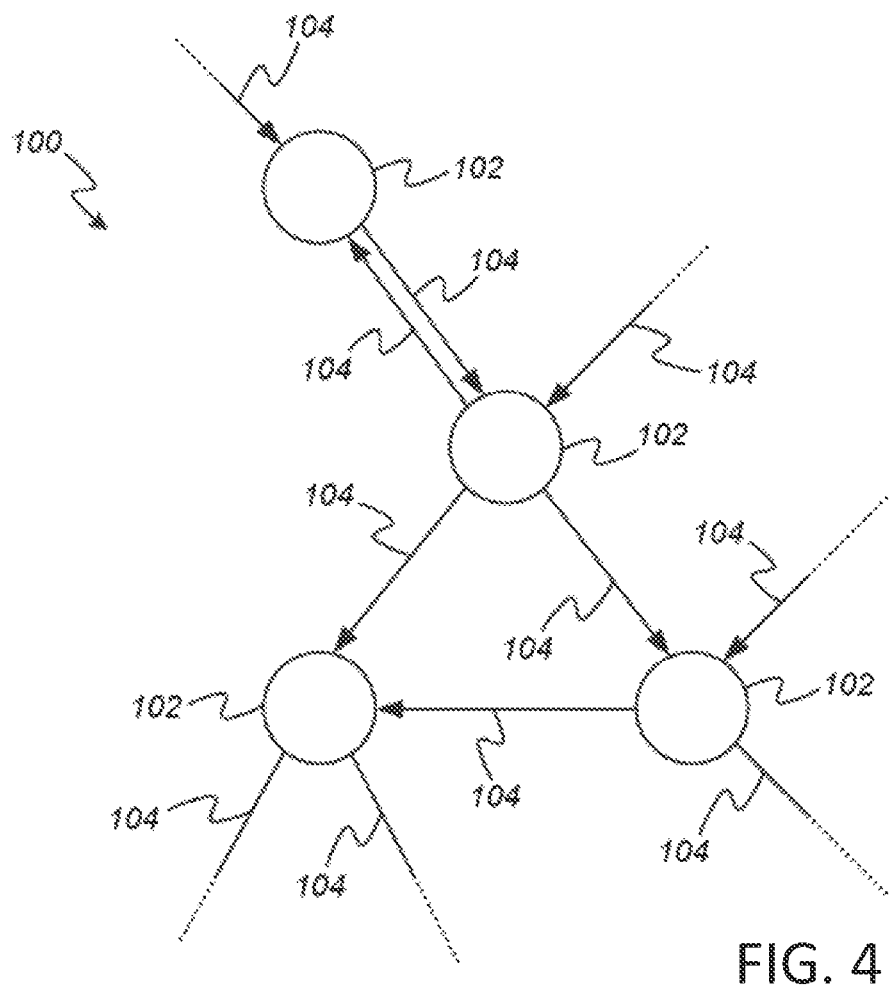
FIG. 4 is a schematic illustration of a graph used in a machine intelligence algorithm.

In one exemplary application of a multi-threaded and/or multi-tiled processor or system, the program run across the multiple threads and/or tiles 4 comprises a machine intelligence algorithm, such as an algorithm configured to train a neural network and/or to perform inference based on a neural network. In such embodiments each worker thread, or the part of the program run on each tile, or each worker thread on each tile, is used to represent a different node 102 in a neural network (a type of graph); and communications between threads and/or tiles, accordingly, represent edges 104 between nodes 102 in the graph. This is shown in FIG. 4.

Machine intelligence begins with a learning stage where the machine intelligence algorithm learns a knowledge model. The model comprises a graph of interconnected nodes (i.e. vertices) 102 and edges (i.e. links) 104. Each node 102 in the graph has one or more input edges and one or more output edges. Some of the input edges of some of the nodes 102 are the output edges of some others of the nodes, thereby connecting together the nodes to form the graph. Further, one or more of the input edges of one or more of the nodes 102 form the inputs to the graph as a whole, and one or more of the output edges of one or more of the nodes 102 form the outputs of the graph as a whole. Sometimes a given node may even have all of these: inputs to the graph, outputs from the graph and connections to other nodes. Each edge 104 communicates a value or more often a tensor (n-dimensional matrix), these forming the inputs and outputs provided to and from the nodes 102 on their input and output edges respectively.

Each node 102 represents a function of its one or more inputs as received on its input edge or edges, with the result of this function being the output(s) provided on the output edge or edges. Each function is parameterized by one or more respective parameters (sometimes referred to as weights, though they need not necessarily be multiplicative weights). In general the functions represented by the different nodes 102 may be different forms of function and/or may be parameterized by different parameters.

In the learning stage the algorithm receives experience data, i.e. multiple data points representing different possible combinations of inputs to the graph. As more and more experience data is received, the algorithm gradually tunes the parameters of the various nodes 102 in the graph based on the experience data so as to try to minimize the errors in the parameters. The goal is to find values of the parameters such that the output of the graph is as close as possible to a desired output for a given input. As the graph as a whole tends toward such a state, the graph is said to converge. After a suitable degree of convergence the graph can then be used to perform predictions or inferences, i.e. to predict an outcome for some given input or infer a cause for some given output.

The learning stage can take a number of different possible forms. For instance, in a supervised approach, the input experience data takes the form of training data, i.e. inputs which correspond to known outputs. With each data point, the algorithm can tune the parameters such that the output more closely matches the known output for the given input. In the subsequent prediction stage, the graph can then be used to map an input query to an approximate predicted output (or vice versa if making an inference). Other approaches are also possible. For instance, in an unsupervised approach, there is no concept of a reference result per input datum, and instead the machine intelligence algorithm is left to identify its own structure in the output data. Or in a reinforcement approach, the algorithm tries out at least one possible output for each data point in the input experience data, and is told whether this output is positive or negative (and potentially a degree to which it is positive or negative), e.g. win or lose, or reward or cost, or such like. Over many trials the algorithm can gradually tune the parameters of the graph to be able to predict inputs that will result in a positive outcome. The various approaches and algorithms for learning a graph will be known to a person skilled in the art of machine learning.

One common algorithm used in training machine intelligence models is gradient descent. For neural networks comprising parameters of the nodes 102 to be tuned as described above to experience data. In gradient descent, this tuning is performed by defining a loss or error function, and updating the parameters of the model in the negative direction of the gradient of the loss function, in other words updating the parameters so as to minimise the defined loss function. Multiple types of gradient descent algorithms have been developed, and these will be familiar to a person skilled in the art of machine learning.

When training machine intelligence models based on experience data, depending on the task, very large amounts of data may need to be processed at one time. One method of improving the efficiency of processing is to employ multi-threading and concurrency, as mentioned above, such that multiple threads execute concurrently, which allows pipeline latency to be hidden. Another way to improve the speed and efficiency of processing is to change the format of the data being processed such that the data values of the network each are stored using less memory, such that more individual data elements can be processed at the same time, and such that more data elements can be stored to a given capacity of memory at any given time during processing.

Typically parameters and values of a neural network, as well as gradients, are stored in floating point format. 'Single precision' floating point format values have 32 bits, and this may be referred to as 32-bit floating point format or float32, while 'double precision' numbers, or 'doubles' are represented with 64 bits. Similarly, 16-bit floating point numbers are referred to as 'half precision', and 8-bit floating point numbers, though less widely used, may be referred to as 'quarter precision'.

The floating-point representation comprises 3 separate components: a sign component, a mantissa component, and an exponent component. In the single-precision (i.e. 32-bit) floating point representation according to the IEEE 754 standard, the sign component consists of a single bit, the exponent consists of 8 bits, and the mantissa consists of 23 bits. In the standard half-precision (i.e. 16-bit) floating-point representation, the sign component consists of a single bit, the mantissa consists of 10 bits, and the exponent consists of 5 bits. In most cases, a number is given from these 3 components by the following formula:

$$(-1)^{signbit} \times 1 \cdot mantissa \times 2^{exponentbits-offset}$$

The displayed "offset" to the exponent is dependent upon the number of bits used to represent the exponent, which is dependent upon the precision level. In the single-precision representation, the offset is typically equal to 127. In the half-precision format, the offset is typically equal to 15. However, it should be noted that different numbers of exponent bits may be defined for a given precision or total number of bits in the floating point representation, and that assignments of bits other than the standards mentioned above are possible.

"I" is an implicit bit, which is derived from the exponent. In the case that the exponent bit sequence consists of anything other than all zeros or all ones, the implicit bit is equal to one and the number is known as a "Norm". In this case, the floating point number is given by:

$$(-1)^{signbit} X 1 \cdot mantissa \ X 2^{exponentbits-offset}$$

In the case that the exponent bit sequence consists of all zeros, the implicit bit is equal to zero and the number is a subnormal number, also referred to herein as a "denorm", "denormal" or "denormalized number". The terms 'subnormal' and 'denorm' or 'denormalized number' may be used interchangeably herein to refer to a number between the smallest norm and zero. In this case, the floating point number is given by:

$$(-1)^{signbit} X 0 \cdot mantissa \ X 2^{exponentbits-offset}$$

The denorms are useful, since they allow smaller numbers to be represented than would otherwise be representable by the limited number of exponent bits.

When a number is too small to be represented in the number of mantissa and exponent bits for the given floating point representation, this is referred to as underflow. A method for reducing underflow in training machine intelligence models will be described later. Non-zero values that fall below a threshold of representable values may be treated as 'subnormal' numbers, which are floating-point values that fill the underflow gap between the lowest 'normal' representable number and zero. It is possible to represent subnormal numbers by using an implicit bit based on the values of the exponent bits as described below.

According to embodiments of the present invention, the execution unit 18 is configured to execute a novel machine code instruction. The histogram instruction, also referred to herein as a 'hist instruction' takes two operands: the first operand defines a set of multiple bins by the range of values each bin spans, as well as a count of values in each bin, and the second operand defines a vector of multiple values. The hist instruction is executed to determine which bin of the histogram each value falls into, and to increase the histogram count for that bin by one for each value falling within the range.

As is understood in the field of computer processor architecture, a machine code instruction is expressed as an opcode defining the operation of the instruction, and one or more operands, containing data to which the operation is applied. A hist instruction takes as operands (a) register indexes for a set of registers containing state information of a set of bins, (b) the state information comprising bin edges and counts, and (c) a vector of values to be added to the histogram, and adds any values falling within the limits of each bin to the count of that respective bin, as will be described in more detail below. The hist instruction can be defined in more than one numerical format, for example a hist instruction can be defined for vectors of 32-bit floating point numbers, as well as for 16-bit floating point numbers and 8-bit floating point numbers. Both the histogram bin state information and the vector of values are stored in respective registers defined in the ARF 26A.

The hist instruction may apply to vectors of values having 32-bit, 16-bit or 8-bit representations, and each format has a different instruction opcode, as the function of the instruction differs slightly for each format, as will be described in more detail below. The operand of the hist instruction specifying the vector of values to be binned is a set of register indices which hold a defined number of bits. In other words, where a given register or set of registers referred to in an operand holds a vector of four 32-bit values, amounting to 128 bits in total, if the values to be processed are instead represented in 16 bits, the same register or registers can hold twice as many values, i.e. a vector of eight values. For 8-bit values, the same registers referred to by the given operand can hold sixteen values for a total of 128 bits.

The naming convention used herein for the hist instruction is 'f32v4hist', wherein 'f32' refers to the floating-point format of the input and 'v4' refers to the size of the vector. As mentioned above, for lower-precision representations, the number of values of the vector that can be processed in one instruction increases. This leads to multiple hist instructions, having names 'f32v4hist', 'f16v8hist', which bins vectors of 8 values represented in half-precision or float-16 format, and 'f8v16hist', which bins vectors of 16 values represented in 'quarter-precision' or float-8 format. Note that this list of instructions is not exhaustive, and other instructions may be defined having the same functionality described below for representations of different numbers of bits and/or vectors of different sizes.

The 32-bit hist instruction 'f32v4hist' will now be described. This instruction causes the execution unit 18 to count a vector of four single-precision (i.e. 32-bit) elements into a histogram of four buckets (bins). In the present example, each register is a 32-bit register, such that the second operand specifies an array of four 32-bit values. However, in other embodiments, registers may have a different capacity, for example 16 bits or 64 bits, and the size of the vector and/or precision of the values may differ. As described later, for a given register capacity, different instances of the hist instruction can be defined to process vectors having lower-precision representations, such that the relationship between values and registers is not necessarily one to one. Note that while this example describes a histogram of four bins, a histogram of any plural number of bins may be used. The instruction takes, as a first operand, state information of the histogram, which comprises a number of fields, described in more detail below and, as a second operand, the vector of values. The instruction is configured to control the execution unit 18 to update a count field for each bin of the histogram, before storing the updated histogram values back to their corresponding register(s). This is described below with reference to FIG. 5.

The instruction has the following syntax: f32v4hist $aSrcDst0:aSrcDst0+3 $aSrc0:aSrc0+3, where f32v4hist is an instruction identifier as described above, and where the operands each identify a register index range identifying a set of four registers of the ARF 26A from SrcDst0 to SrcDst0+3. 'SrcDst' is used to indicate that the registers are both source and destination registers for the hist instruction. This operand defines the state information for the histogram, which comprises counts and ranges of the histogram bins, and once the instruction is executed, the updated bin counts are stored back to the same range of registers. Only the bin counts are affected by the hist instruction, other state information is fixed.

Each bin is defined by a range of exponents [base, base+range]. In one example embodiment, each element of the first operand has 32 bits, and takes, the following format:
  [17:0] BIN_COUNT: Eighteen bits of each bin of the first operand are assigned to a saturating count value (in other words, when a predefined maximum count is reached, the instruction no longer updates the counts).
  [25:18] THRESH_EXP: These 8 bits represent a lower threshold exponent configuration value defining the limit of the given bin. This field is not modified by the execution of the hist instruction.

[29:26] THRESH_RANGE: These four bits represent an exponent range configuration value. These bits have two special values. When THRESH_EXP is not equal to all ones, then a THRESH_RANGE of 0 (also written as 0b0000) means that all exponents equal to and below THRESH_EXP for the current bin should be counted, and a THRESH_RANGE of 0b1111 means that all exponents equal to and above THRESH_EXP for the given bin are counted.

[31:30] SIGNC: These two bits determine the treatment of sign when adding new values to the histogram. 0b00 or 0b01 mean that sign is disregarded, and both positive and negative values are counted if they fall within the given range for the bin. 0b10 means that only positive values are counted. 0b11 means that only negative values are counted.

Figure 5:
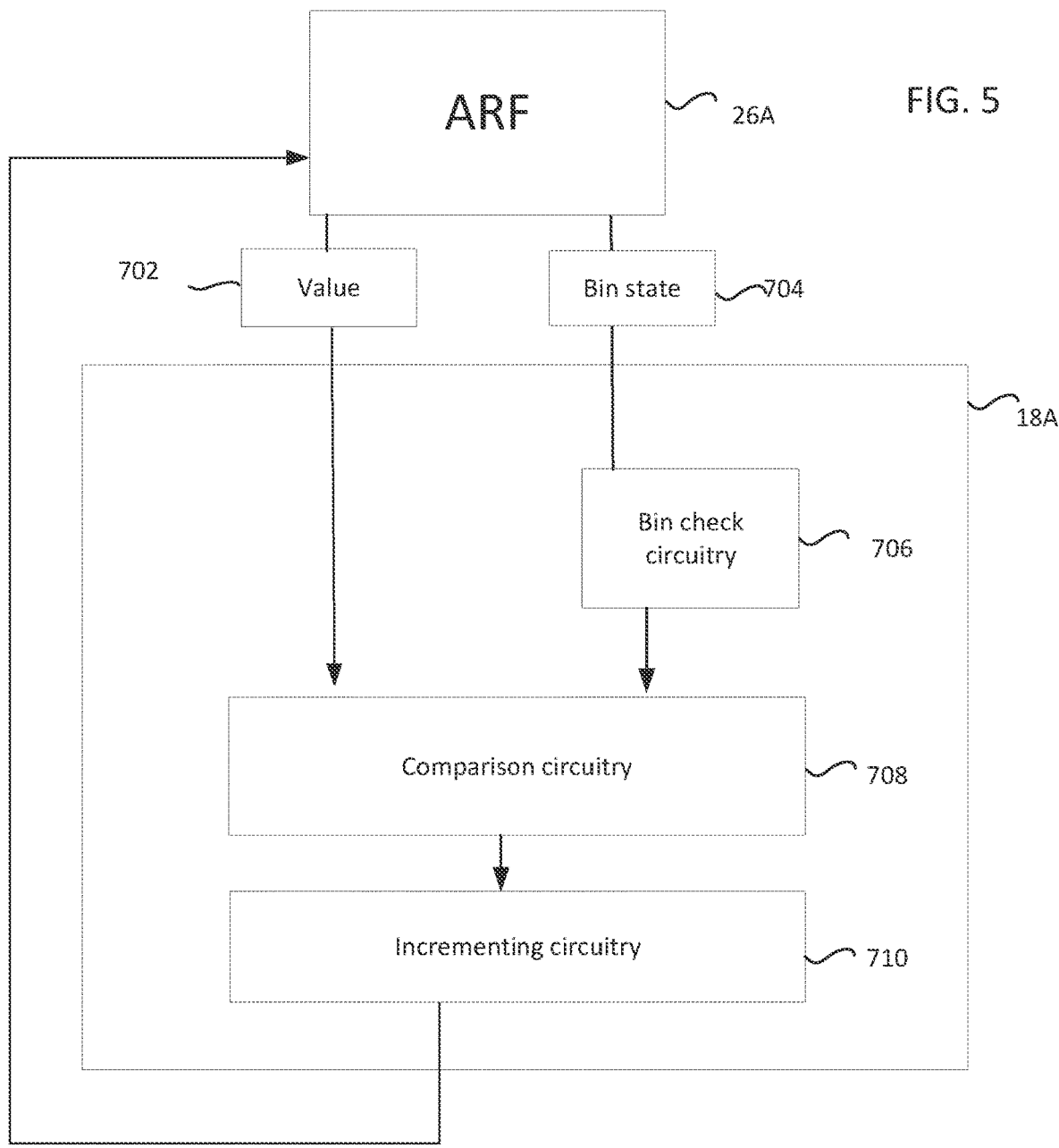
FIG. 5 is a schematic block diagram of logic circuitry for implementing the hist instruction.

FIG. 5 shows example logic circuitry implemented in the execution unit 18 for carrying out the steps of the hist instruction. As a floating-point instruction, the circuitry for carrying out the hist instruction is implemented within the FPU of the auxiliary execution unit 18A. Note that while FIG. 5 only shows the circuitry necessary for carrying out the hist instruction, the FPU of the auxiliary execution unit 18A further comprises circuitry for performing other types of floating-point operations.

As described above, the instruction takes as operands register indexes specifying registers holding state information 704 for the bins of the histogram, and further registers holding values of a vector 702 to be added to the histogram, both of which are held in the arithmetic (or auxiliary) register file 26A. The bin state information is passed to bin check circuitry 704 which performs checks on the state information of the bin, in which the bits of the threshold exponent and the threshold range for the given bin are checked for special values of THRESH_EXP and THRESH_RANGE as described above.

In the present embodiment, described further below with reference to FIG. 6, subnormals are treated as zero, and no special value for THRESH_EXP is used. However, in other embodiments, as described below with reference to FIG. 7, a special value of 0b11111111 for THRESH_EXP is defined which defines that the given bin contains zeros or denorms only, with the value of THRESH_RANGE determining whether the bin is used to count zeros (if THRESH_RANGE=0) or denorms (for any other value of THRESH_RANGE). Special values of THRESH_RANGE for the case where THRESH_EXP is not 0b11111111 are described above.

The special cases described above indicate different modes of operation for the instruction, and are also referred to herein as 'mode indicators'. For example, if the THRESH_EXP is not 0b11111111, and THRESH_RANGE is 0, the hist instruction for that bin operates in a mode that counts values less than or equal to a threshold, instead of the default mode which counts values within a range with an upper and lower limit. The bin check circuitry checks for each of these special cases, as well as checking the SIGNC bits of the bin to determine how to process the sign of the value. The bin check circuitry then outputs one or more signals indicating whether any special cases are flagged by the histogram state, and if so, which. This is passed to the comparison circuitry 708 which processes the value along with the bin state information and determines if the value falls within the range defined for that bin. Note that each value of the vector is processed for each bin of the plurality of bins defined by the instruction. However, FIGS. 6 and 7 are simplified for clarity and only shows the process for a single value for each bin.

The bin check circuitry 706 is shown in FIG. 5 as a single component, but may comprise multiple logical components for checking both the threshold exponent and threshold range and for directing the state information to the comparison circuitry 708. If the bin check circuitry 706 determines that the threshold exponent and threshold range do not have special values, then these are processed by logic within the comparison circuitry, which takes the value 702 of the vector and determines if it falls within the range for the given bin, i.e. if it is equal to or above the threshold exponent for the bin and below the upper limit given by the threshold exponent and threshold range. The comparison circuitry also comprises logic for the special cases described with reference to FIG. 7. Where the bin check circuitry 206 determines that the threshold exponent takes the special value of 0b11111111, and the threshold range is 0, then only zeros are to be counted, and the value 702 is passed to logic that checks the mantissa and exponent of the value are zero. Logic is also implemented to check if the value 702 is a denorm, where the bin check circuitry 706 determines that the threshold exponent and range are set to the respective values to indicate this special case, as described above. Again, the comparison circuitry 708 is shown as a single component, but may comprise many logic circuits to handle the multiple special cases described above, and further described below with reference to FIGS. 6 and 7. If the THRESH_EXP and THRESH_RANGE do not take any of the above-mentioned special values, the instruction reverts to the default mode of counting values whose exponents fall in the range [THRESH_EXP, THRESH_EXP+THRESH_RANGE). For all cases, the comparison circuitry 708 comprises logic to compare the value to either the bin state or to a special value (such as zero) and to issue a signal to the incrementing circuitry if and only if the value satisfies the condition of the comparison logic.

The incrementing circuitry 710 increases the bin count of the bin state 704 by one if a corresponding signal is received from the comparison circuitry 708. Updated counts are written back to the register containing the bin state in the ARF 26A as shown by the arrow from the incrementing circuitry 710. Note that while the above description only refers to the processing of a single value of the vector for a single bin, the steps above are repeated for each given value and bin. The writing back of the bin counts to registers of the ARF 26A may be performed only after all values and bins of the instruction have been processed, where a vector of the counts for all bins is used to maintain the updated count values while the instruction executes, and before the counts are written back to the register of bin state information.

Figure 6:
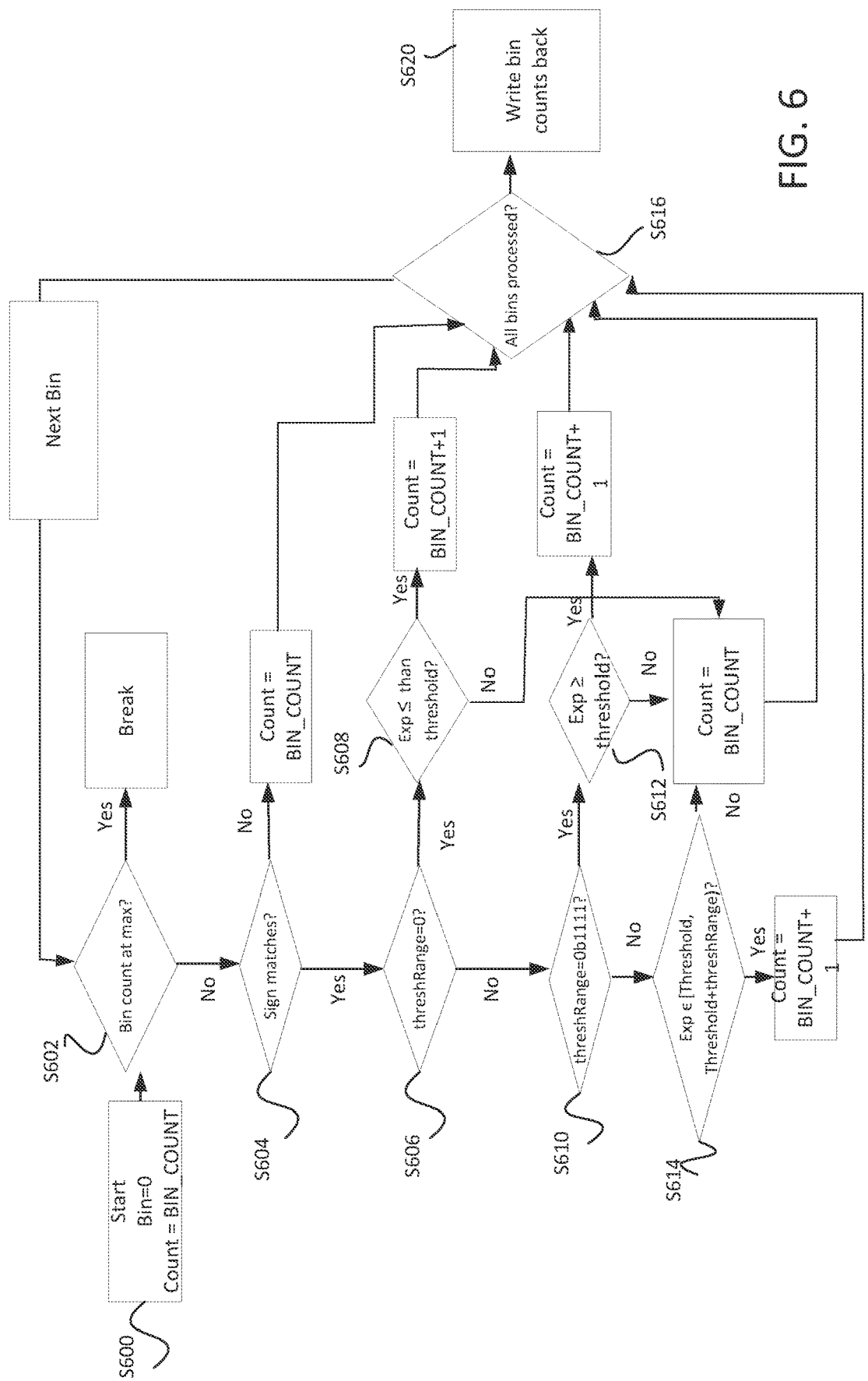
FIG. 6 is a flow diagram illustrating the logic of a hist instruction.
Figure 7:
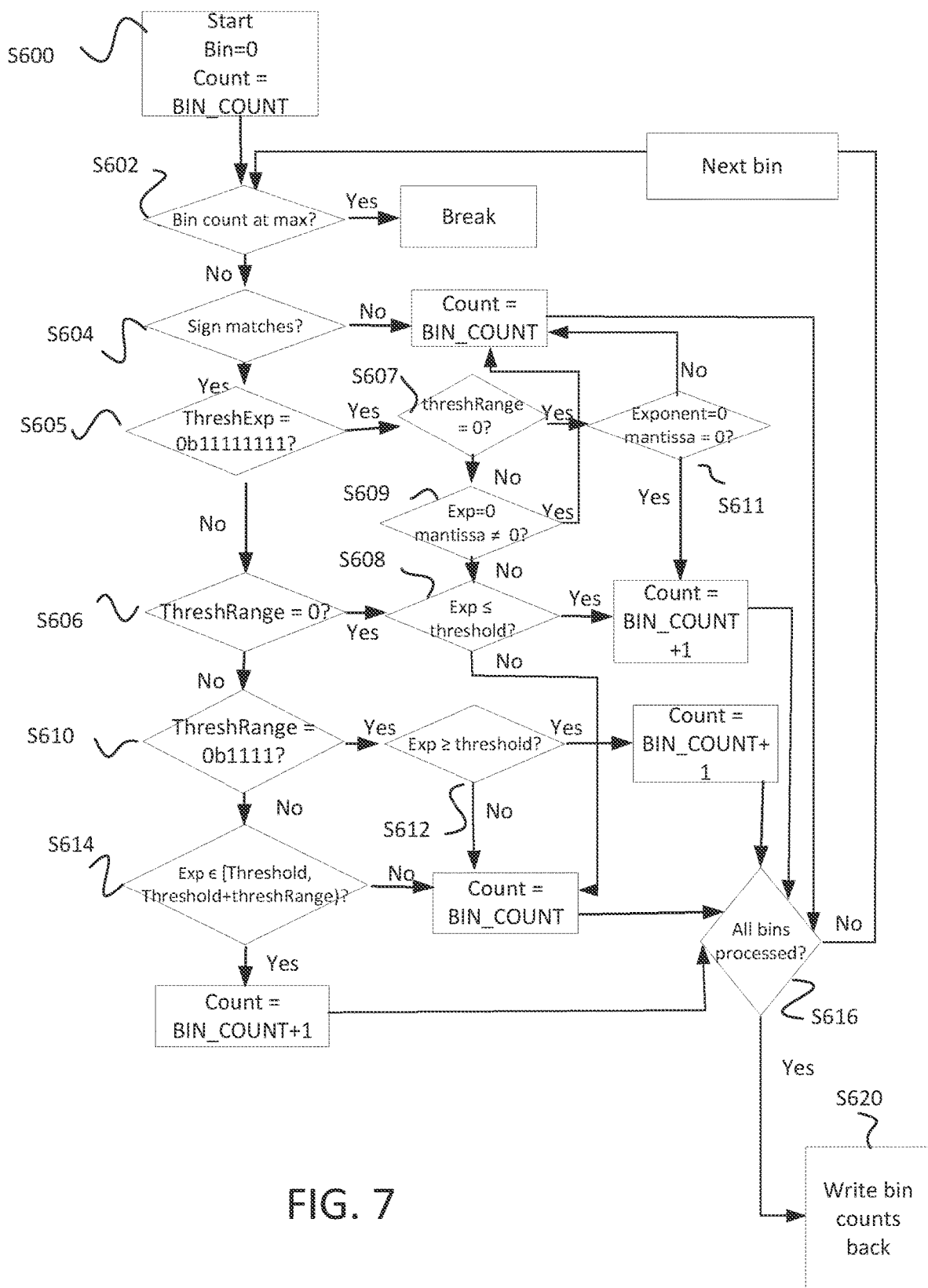
FIG. 7 is a flow diagram illustrating the logic of a second hist instruction, FIG. 8 schematically illustrates how a histogram generated by a hist instruction is used to adjust a scale factor for training a machine intelligence model.

FIG. 6 is a flow diagram illustrating the steps of executing the hist instruction for the case where subnormal values are treated as zero. Before the instruction computation starts, the execution unit 18 prepares the data of the operands in order to extract the individual elements for each bin, and for each value of the vector, such that each operand is represented as an array of values in the given numerical representation, which in the present example is 32-bit floating point.

At step S600, the bin index is set to zero, representing the first bin of the histogram. The schematic drawings shown in FIG. 6 and FIG. 7 illustrate the steps taken to process a single value for a single bin, which may for example be the first bin. However, as noted above, multiple bins may be processed in parallel, and in such embodiments, the initialisation step S600 is not required to set an initial bin which is fully processed before the execution unit considers the next bin, instead some or all of the bins may be processed by steps S602-S614 simultaneously. The count of the bin is the BIN_COUNT bits read from the BIN_COUNT as read from the BIN_COUNT bits of that bin in the operand. The count may be added to an array 'counts' which is indexed by bin and which gives the count of values for each bin of the histogram. The 'threshRange' and 'threshExp' variables are also defined as the respective THRESH_RANGE and THRESH_EXP bits of the operand for the given bin.

The auxiliary execution unit 18A processes each value of the second operand, i.e. each value of the vector to be assigned to the bins of the histogram, in a loop. The processing of multiple values is not shown in FIG. 6 or 7. However, as noted above, the processing of the bins and values may be carried out in parallel by the execution unit, and there is no requirement to process each value of the vector in a sequence. These values will be referred to in the below description as 'input values' for conciseness. At step S602, the execution unit 18A checks, for the current bin, whether the count is saturated, i.e. whether the count has reached a maximum count value, where this step is performed using the bin check circuitry 706. If the count is at the maximum value, then the loop breaks, the count does not change and the values are not processed. Otherwise, the instruction proceeds to process the input values in turn. For each input value, the sign bits of the bin are checked at step S604 to see if they match the sign of the input value, based on the values given above for SIGNC. If the signs do not match, the value is not added to the given bin, and the count stays the same.

If the signs match, the bin check circuitry 706 implements S606, which first checks for special values of threshRange. If threshRange is zero, then a check (S608) is performed by the comparison circuitry 708 to determine if the input value has an exponent less than or equal to the threshold exponent for the current bin. As described above, any value having an exponent less than or equal to the threshold exponent threshExp is added to the count for the given bin by the incrementing circuitry 710. If the threshRange is zero but the exponent of the input value is greater than the threshold exponent value threshExp, then the comparison circuitry does not output a signal to indicate to the incrementing circuitry to increment the count, and the count remains the same.

If the threshRange is not equal to zero, then at step S610, the bin check circuitry 706 checks if the threshRange is 0b1111, a second special value in which all values greater than or equal to the threshold are added to the count for the current bin. At step S612, the exponent of the input value is compared with the threshold exponent by the comparison circuitry, and if it is greater than or equal to the threshold exponent, the comparison circuitry 708 outputs a signal to the incrementing circuitry 710 and the value is added to the count for the current bin, otherwise the count remains the same.

Finally, if the threshRange does not have either of the above special values, then a check is performed by the comparison circuitry 708 to determine if the input value exponent lies within the defined exponent range for the current bin, at step S614. The comparison circuitry checks if the input value satisfies the following condition: exponent≥threshExp AND exponent<(threshExp+threshRange). If the exponent lies within this range then the comparison circuitry 708 outputs a signal to the incrementing circuitry 710 and the count is increased by one for the current bin. Otherwise, the count for the current bin remains the same.

While the loop for each value of the input vector is not shown in FIG. 6, the steps S602-S624 are performed for each input value of the vector. While a loop for each bin and floating-point value of the vector is described, there is no requirement to perform the processing of bins and values in sequence, or in any specific order. In practice, since the incrementing of a bin for a given value has no dependence on other bins and values, the comparison between the input values and the range of values specified for each bin may be performed in parallel in the hardware. In parallel, more than one bin is processed in relation to one or more of the input values simultaneously. All that is required for all bins and values is that the state information is checked for each bin to determine if any special cases apply, and that the state information for each bin is compared with each value of the input. Once the vector has been fully processed for a given bin of the histogram, the execution unit 18A proceeds to step S616, where it checks if all bins have been processed according to the instruction. If they have not, the next bin is selected for processing and the relevant steps of S604-S614 are repeated for each value of the input vector with respect to the next histogram bin. Once all bins have been processed in this way, the counts array, having been updated based on the values of the input vector, are set as the new BIN_COUNT values for each bin in the operand, and written back to the original registers for the first operand.

Note that the special values threshRange=0 and threshRange=0b1111 allow generation of cumulative histograms. When threshRange-0, all values with exponents equal to the threshold exponent of the current bin, or any lower exponent are counted in the current bin, therefore accumulating the values in all lower bins plus the values falling within the range of the current bin. Conversely, when threshRange-0b1111, the values having exponents equal or greater than the threshold exponent for that bin are counted, meaning that the bin having the lowest threshold value contains all values in that bin plus values falling within the ranges of all higher bins.

The above example describes processing of 32-bit vector values by the execution unit 18A in response to a 32-bit version of a hist instruction. However, this is not limiting, and the described process can be applied for adding values of any floating point precision to a histogram. In one example embodiment, subnormal 32-bit floating point numbers are treated as zero, while lower-precision floating point subnormal numbers can be counted as denorms, separately to zeros, by the hist instruction. When processing values that may contain denorms, an additional step may be performed to allow the counting of zeros or denorms only for a given bin. This is shown in FIG. 7, where the steps are identical to those in FIG. 6, with the addition of step S605 to check the value of threshExp.

At step S605, if threshExp has the special value 0b11111111, a check S607 is then performed by the bin check circuitry 706 to determine if threshRange is 0. If threshRange is 0, then the count for the given bin is only increased for zero values, as determined at step S611, in which the comparison circuitry 708 checks that the exponent and the mantissa of the input value is zero, and if it is, signals to the incrementing circuitry to increase the count for the current bin by one. If threshRange takes any other value, then at S609, a check is performed by the comparison circuitry 708 to determine if the input value is a denorm. This circuitry checks if the exponent is zero and the mantissa is non-zero, in which case the value is a denorm. If the exponent and mantissa are both zero, as described above, the value is zero and this is not added to the denorm count in this mode given by the special value of threshExp. If the value is a denorm, then a signal is sent to the incrementing circuitry 710 to increment the count for the given bin by one, otherwise the count does not change. The 'modes' indicated by special values of the threshExp and threshRange bits are also referred to herein as 'special modes'

If the threshold exponent takes any value other than 0b111111111, this is treated as a 'default mode' then the processing continues from step S606 as described above for FIG. 6. In some embodiments, as described above, f32 subnormals are treated as zero and added to the count for bins whose range includes zero. For lower-precision formats, when the threshold exponent does not take a value of 0b111111111 (i.e. in the default case), although denorms are not treated as zero, since the bins are determined based on the value of the exponent only, denorms and zeros are added to the count for the same bin, and are therefore treated the same.

When the instruction is implemented as described above for lower-precision formats, the execution unit 18 prepares the values of the vectors before being processed by applying a function to the register data of the second operand in order to extract 16-bit values from a set of 32-bit registers. For 16-bit floating point numbers, a function 'pickHalf', taking 0 or 1 as an argument along with a register index, returns either the first or second half of the bit string at each register index as a separate 16-bit value. This can be implemented with both halves of a given 32-but register in order to extract two 16-bit floating point numbers from the 32-bit operand register. Similarly, for 8-bit floating point values, a function 'pickQuart' is implemented with each of 0, 1, 2, 3 and 4 as arguments, to extract different quarters of the 32-bit operand register data to use as 8-bit values of a vector. This conversion process allows 16-element f8 vectors and 8-element f16 vectors to be processed in a single instruction as defined above, where four 32-bit registers are provided as the second operand. Note that other versions of the hist instruction may be defined with a different number of registers specified in the second operand and/or with registers of different capacities, and the above-described implementation is not limited to four 32-bit registers.

The execution of the above-described hist instruction allows multiple values to be added to a multi-binned histogram in a single machine code instruction, which enables faster and more efficient computation when compared with standard arithmetic instructions.

Collecting histograms of data being processed is useful for generating statistics or accumulated metrics for data being processed by the computer system. One example application of a histogram in the context of machine intelligence applications is automatic loss scaling of gradients when training a neural network. As mentioned briefly earlier, different floating-point formats may be used to represent values in neural network training, and a scaling factor may be used for lower-precision formats to reduce numerical underflow. This works by scaling up the gradients by a constant factor, and processing the scaled gradients in a lower precision format for expensive computations such as matrix multiplications and convolutions, and rescaling back down by the same factor when expensive computations are complete and a higher-precision format is used instead. One potential problem with loss scaling is that when the scaling factor is too large, the scaled gradients may be increased beyond an upper threshold of representable values available in the given format. Automatic loss scaling works by computing a statistical distribution of the gradients in order to determine what proportion of the gradients fall above and/or below a predefined threshold, and increasing or decreasing the loss scaling factor in response to the determined proportion. A histogram of gradients may be generated to represent this statistical distribution of gradients. In the simplest example, a histogram of two bins may be used, with the threshold exponent of the histogram defining an exponent close to the upper limit of representable values in the given numerical precision. This example is shown in FIG. 8.

Figure 8:
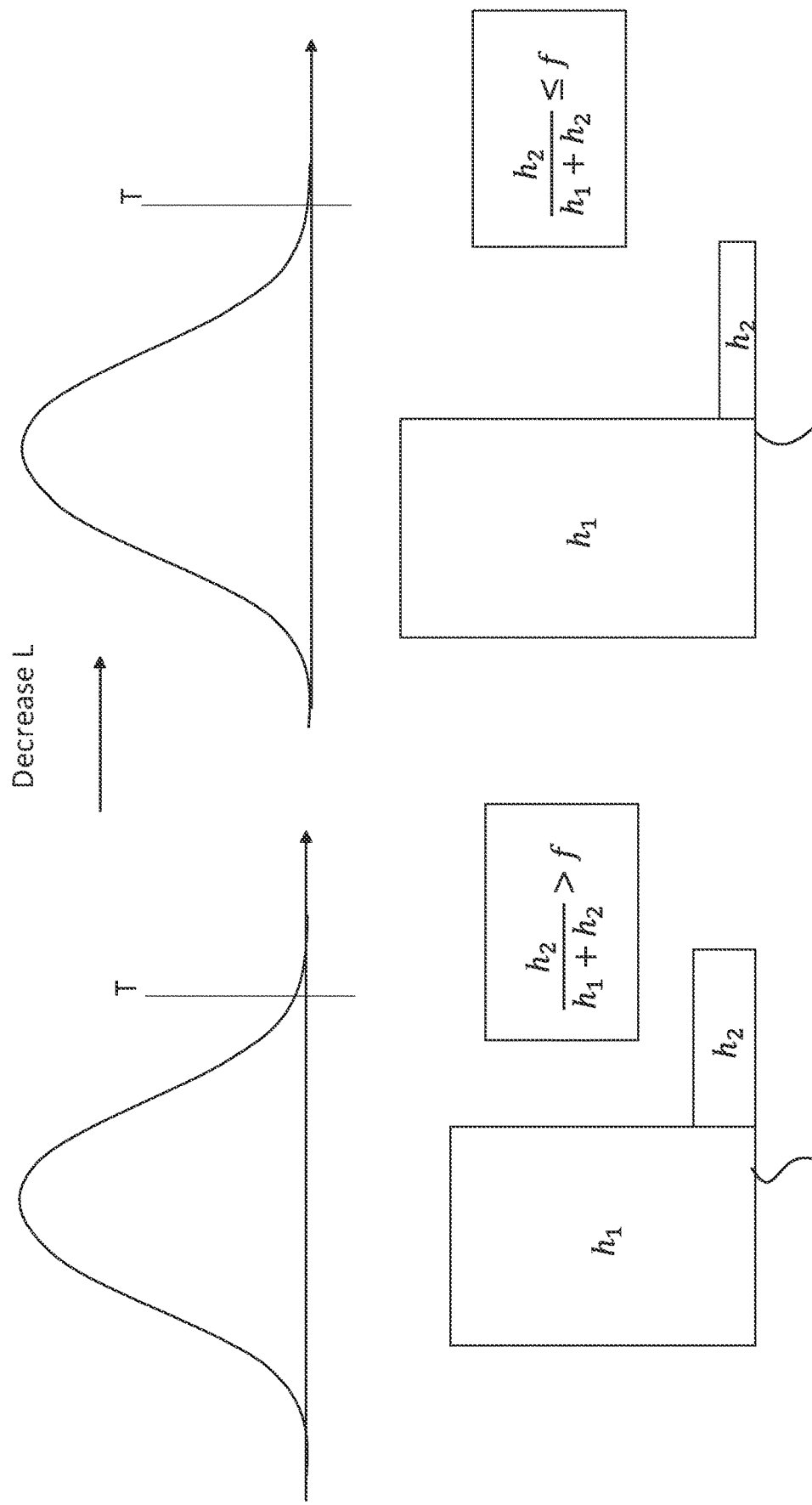

FIG. 8 shows how the loss scaling factor affects gradient statistics and prevents numerical overflow. On the left of FIG. 8, a simplified distribution of gradient values is shown. This distribution shape is merely illustrative and is not intended to represent a realistic distribution of gradient values. A threshold T is shown, above which a small number of gradients lie. The same distribution is represented in a quantised form as a histogram 802 of two bins: the first bin h1 gives a count of all the gradients lying below the threshold T and the second bin h2 gives a count of all the gradients lying above the threshold T. The hist instruction described above implemented for a set of two bins may be used to generate the histogram 802 by processing the gradients of the network as a set of vectors of size n, where n is determined based on the capacity of the registers and the precision of the gradient representations. The total number of gradients to be processed may be very large, and the gradients may be loaded as a vector of n elements at a time into an operand register for processing by the hist instruction.

The histogram 802 represents the number of values within the range defined for each bin, and therefore the threshold exponents and threshold range bits do not take any special values, and the count is based on whether the value's exponent falls within the exponent range defined for each bin of the histogram, which are defined by a user in advance.

The threshold exponent may be chosen as an exponent close to the maximum representable value within the given numerical representation. For the purpose of avoiding overflow, a useful statistic is to determine what proportion of the gradients are above a value close to the maximum representable value in the given numerical format. For example, for FP16, a threshold may be chosen at half of the maximum number representable by FP16, which is 33762.

The proportion of gradients above this threshold gives an indication of how much overflow is occurring in the network. This proportion may be obtained directly from the counts determined by the hist instruction described above for the overall set of gradients as follows:

$$p = \frac{\text{count}[1]}{\text{counts}[0] + \text{counts}[1]},$$

where p is the proportion of gradients above the threshold, and counts is the array computed by the hist instruction and written to the first operand register containing the histogram.

A minimum proportion f may be set at which it is determined that the loss scaling factor is too high, causing too many gradients to overflow, and should be reduced. An example proportion f for FP16 may be chosen to be $10^{-6}$, for example. Note that the histograms in FIG. 8 are not to scale.

Once it is determined that a proportion greater than f of the gradients lie above the threshold T, the loss scaling factor may be reduced by a factor s. This has the effect of shifting the distribution of gradients down, once they are scaled by this factor, such that a smaller proportion of the gradients lie above the threshold T. An algorithm may be applied which either increases the loss scaling factor at each of a plurality of loss scaling factor update steps if it is below a threshold, or only updates the loss scaling factor after a number of consecutive update steps wherein the proportion above the threshold is below the critical fraction f.

A gradient histogram may be computed which comprises more than two bins. In this case, the hist instruction simply defines as a first operand a set of n bins, where n=4 in the description of FIGS. 6 and 7, and where n=2 in the example application of FIG. 8. In the case where the gradient histogram comprises more than two bins, with bin edges {$b\_1, b\_2, \ldots, b\_(n-1)$} and bin counts {$h\_1, h\_2, \ldots, h\_n$}, then for a given threshold T, and after M consecutive optimizer steps, the loss scaling factor L is increased only if the proportion of the total count of all bins whose edges are greater than or equal to threshold T does not exceed the user defined fraction f. That is to say:

$$\frac{\sum_{b_i \geq T} h_i}{\sum h_i} \leq f.$$

In terms of the counts computed by the hist instruction as described with reference to FIG. 6, this condition may be written as:

$$\frac{\sum_{threshExp[i] > T} count[i]}{\sum count[i]} \leq f.$$

The loss scaling factor is decreased when the proportion of values in bins falling above the threshold is above the critical fraction f.

This allows flexible use of lower-precision formats for representing gradients of a neural network in lower-precision formats, enabling more efficient computing, in particular for compute-intensive operations such as matrix multiplications and convolutions.

Note that histograms of values may be useful for other applications within machine intelligence models and elsewhere, and that the hist instruction is broadly applicable for determining distributions of any given set of floating point numbers. For example, the number of denorms in a given dataset may indicate the degree of underflow in processing the dataset, which may also be used to inform the numerical format used to represent the values for this processing. In an extended version of loss-scaling described above, both denorms (or values below some predetermined lower threshold close to the minimum representable value) and values above a threshold close to a maximum representable value may be monitored in order to tune the scaling factor most effectively, giving the best possible trade-off between the two ends of the dynamic range representable in the given format. For example, if most values fall within a limited range within a higher-precision representation, such as FP32, it may be determined that it would be more efficient to represent the data in a lower-precision format, such as FP16. Conversely, if the number of denormalized values and the number of values above a predefined threshold near the upper end of representable values is high, this indicates that the format used for representing the set of values does not adequately cover the range of values and that a higher-precision representation may be needed. This is just one example of a range of applications for collected statistics of processed data. Other variants or use cases of the disclosed techniques may become apparent to the person skilled in the art once given the disclosure herein. The scope of the disclosure is not limited by the described embodiments but only by the accompanying claims.

The invention claimed is:

1. A processing device comprising:
a plurality of operand registers, wherein a first subset of the operand registers is configured to store state information for a plurality of bins, wherein for each of the plurality of bins, the state information comprises a range of values and a bin count associated with a respective bin, wherein a second subset of the operand registers is configured to store a vector of floating-point values; and
an execution unit configured to execute a first instruction taking the state information for the plurality of bins and the vector of floating-point values as operands, and in response to execution of the first instruction, for a first floating-point value of the vector:
identify, based on an exponent of the first floating-point value, a first bin of the plurality of bins for which the first floating-point value falls within an associated range of values for the first bin; and
increment a first bin count associated with the first bin.

2. The processing device of claim 1, wherein the execution unit is further configured, in response to execution of the first instruction:
identify, based on an exponent of a second floating-point value of the vector, a second bin of the plurality of bins for which the second floating-point value falls within an associated range of values for a second bin; and
increment a second bin count associated with the second bin.

3. The processing device of claim 2, wherein the processing device is further configured to generate a histogram from bin count statistics for the plurality of bins, the bin count statistics including the first bin count and the second bin count.

4. The processing device of claim 1, wherein identifying the first bin comprises selecting each bin of the plurality of bins, and for each bin, implementing comparison circuitry to compare the exponent of the first floating-point value with a condition defining a respective associated range of values of each bin.

5. The processing device of claim 4, wherein the state information for the first bin comprises a sign indicator for the first bin, and wherein the execution unit further comprises sign check circuitry to compare a sign of the first floating-point value with the sign indicator of the first bin, wherein the associated range of values of the first bin comprises only values matching the sign indicator of the first bin.

6. The processing device of claim 4, wherein the execution unit is further configured, in response to execution of the first instruction, to identify whether each of a plurality of floating-point values fall within the respective associated ranges of values for each of the plurality of bins in parallel.

7. The processing device of claim 1, wherein, for the first bin, the state information comprises a threshold exponent field and wherein the execution unit is configured to, for the first floating-point value, perform identification of the first bin in dependence upon a value of the threshold exponent field for the first bin.

8. The processing device of claim 1, wherein a threshold bin count saturation value is defined, and wherein the execution unit is configured, in response to the execution of the first instruction, for the first bin, to compare the first bin count to the threshold bin count saturation value, and to identify the first bin from among an unsaturated subset of bins for which the first floating-point value falls within the associated range of values, the unsaturated subset of bins comprising bins having a bin count less than the threshold bin count saturation value.

9. The processing device of claim 1, wherein the state information for each bin comprises at least one mode indicator, and wherein the execution unit comprises bin check circuitry, wherein the bin check circuitry is configured to identify the associated range of values for the first bin based on a value of the mode indicator for the first bin.

10. The processing device of claim 9, wherein the at least one mode indicator comprises an item selected from a list consisting of: a threshold exponent field and a threshold range field.

11. The processing device of claim 10, wherein the at least one mode indicator indicates a default mode, and wherein a lower limit of the associated range of values is a value of the threshold exponent field, and an upper limit of the range of values is a sum of the value of the threshold exponent field and a value of the threshold range field.

12. The processing device of claim 9, wherein the at least one mode indicator indicates a first special mode, and the associated range of values for the first bin comprises either zero or a range of denormalized values.

13. The processing device of claim 12, wherein the at least one mode indicator comprises a threshold exponent field, and wherein the first special mode is indicated by a special value of the threshold exponent field.

14. The processing device of claim 13, wherein the at least one mode indicator further comprises a threshold range field having a value of zero, wherein the associated range of values for the first bin comprises zero only.

15. The processing device of claim 12, wherein the at least one mode indicator further comprises a threshold range field having a value that is non-zero, and the associated range of values for the first bin comprises the range of denormalized values.

16. The processing device of claim 9, wherein the at least one mode indicator indicates a second special mode, and the associated range of values for the first bin comprises all values less than or equal to a threshold for the first bin.

17. The processing device of claim 9, wherein the at least one mode indicator indicates a third special mode, and the associated range of values for the first bin comprises all values greater than or equal to a threshold for the first bin.

18. The processing device of claim 17, wherein the at least one mode indicator comprises a threshold range field, and wherein the third special mode is indicated by a value of the threshold range field.

19. The processing device of claim 1, wherein the execution unit is further configured to process gradients of a machine intelligence application, the gradients scaled by a loss scaling factor, wherein the first instruction is executed by the execution unit for each of a plurality of vectors of the gradients to generate a histogram comprising a second plurality of bins, inclusive of the plurality of bins, and wherein the loss scaling factor is adjusted based on a relative count of a subset of the plurality of bins relative to a total count of all bins of the second plurality of bins.

20. The processing device of claim 1, wherein the first subset of the operand registers and the second subset of the operand registers are included in an arithmetic register file.

21. The processing device of claim 1, wherein the floating-point values of the vector are provided in one of:

a thirty-two bit representation;
a sixteen bit representation; or
an eight-bit representation.

22. The processing device of claim 1, wherein, in response to the execution of the first instruction, where the first floating-point value is a subnormal floating-point value, the execution unit is further configured to:
identify a second bin of the plurality of bins for which zero falls within the associated range of values for the second bin, and increment a second bin count associated with the second bin; or
identify a third bin of the plurality of bins for which denormalized values fall within an associated range of values for the third bin and increment a third bin count associated with the third bin.

23. A non-transitory computer-readable medium comprising code configured to run on a processing device, wherein the code comprises one or more instances of an instruction, taking state information comprising at least a bin count for each of a plurality of bins and a vector of floating-point values as operands, and, when executed, causes the processing device to, for a first floating-point value of the vector:
identify based on an exponent of the first floating-point value, a first bin of the plurality of bins for which the first floating-point value falls within an associated range of values for the first bin; and
increment a first bin count associated with the first bin.

24. The non-transitory computer-readable medium of claim 23, wherein the code further causes the processing device to:
identify, based on an exponent of a second floating-point value of the vector, a second bin of the plurality of bins for which the second floating-point value falls within an associated range of values for a second bin; and
increment a second bin count associated with the second bin.

25. The non-transitory computer-readable medium of claim 24, wherein the code further causes the processing device to generate a histogram from bin count statistics for the plurality of bins, the bin count statistics including the first bin count and the second bin count.

26. A method of operating a processor, the method comprising:
executing a first instruction taking state information comprising a bin count for each of a plurality of bins and a vector of floating-point values as operands, and in response to execution of the first instruction:
identifying, based on an exponent of a first floating-point value of the vector, a first bin of the plurality of bins for which the first floating-point value falls within an associated range of values for the first bin; and
incrementing a first bin count associated with the first bin.

27. The method of claim 26, further comprising:
identifying, based on an exponent of a second floating-point value of the vector, a second bin of the plurality of bins for which the second floating-point value falls within an associated range of values for a second bin; and
incrementing a second bin count associated with the second bin.

28. The method of claim 27, further comprising generating a histogram from bin count statistics for the plurality of bins, the bin count statistics including the first bin count and the second bin count.

* * * * *